Aug. 25, 1936.                J. A. McCASKELL                2,051,960
                              FIBER BAKING PLATE
                              Filed July 25, 1934

INVENTOR
Jasper A. McCaskell
BY
Hammond & Littell
ATTORNEYS

Patented Aug. 25, 1936

2,051,960

UNITED STATES PATENT OFFICE 2,051,960

FIBER BAKING PLATE

Jasper A. McCaskell, Philadelphia, Pa., assignor to William M. McCaskell, Philadelphia, Pa.

Application July 25, 1934, Serial No. 736,851

5 Claims. (Cl. 53—6)

This invention relates to improvements in cooking utensils and more particularly relates to improvements in the method of and means for preventing discolorization of fiber baking plates such as pie plates.

Fiber baking plates as heretofore used have become objectionably discolored due to the carbon in the oven, the boiling over of the contents of the plate, or the carelessness in applying the egg wash to the crust of the pie or for other causes, and as it is difficult and in many cases impossible to clean up this type of utensil the use of fiber baking plates has been materially retarded. The prior known methods of cooking in metal plates and then transferring the cooked material to a clean fiber slip plate is also complicated, expensive and duplication of effort.

One of the objects of my invention is to provide an improved method for preventing the discolorization of the fiber baking plate by holding the pie plate out of contact with the oven during cooking and by shielding the sides of the fiber pie plate to prevent over-running of the contents from spoiling the sides.

Another object of my invention is an alternative method of keeping the bottom of the pie plate from contact with the oven which consists in providing the plate with a separate paper sheet which may be treated with a heat resisting solution such as sodium silicate and a temporary binder so that it is temporarily bound to the bottom of the plate and so that it may be easily removed after baking due to the absorption of the binder in the body of the plate.

Another object of my invention is to provide a multi-layer fiber pie plate having its bottom protective layer impregnated with a heat resistant material and which is temporarily bound to the remainder of the pie plate by a weak and absorbable binder which, after cooking, renders the supplementary sheet removable.

Other objects and advantages of my invention will appear from the following disclosure thereof taken in connection with the attached drawing which illustrates preferred forms of embodiment thereof and in which.

The use of fiber cooking utensils, especially for pie plates has been found to be highly desirable although subject to certain objectionable features. One of these objections is due to discolorization of the fiber pie plates and more general adoption of fiber plates has been prevented because of this. There are several causes of this discolorization such as the normal dirt and carbon on the oven bottom, boiling over of the fruit juices and the staining of the plates due to other contacts. The result has been that pies are still cooked to a very large extent in metal plates and to prevent loss of the metal plates as well as to provide clean holders the pies have been transferred to fiber containers.

This is extremely expensive and requires two plates per pie, one of which is so costly that it must be reclaimed, washed and cleaned and restored for use. Transferring also requires an extra thick crust or spoilage is apt to occur. According to my invention, however, I eliminate this difficulty and I space my pie plates or other cooking utensils not only above the bottom of the oven, but I also protect the sides of the plates. In a preferred construction I do this by initially forming the cooking utensil, such as the pie plate, with a supplementary layer which is suitably treated and which may easily be removed after cooking. This restores the plate to a new, clean and satisfactory appearance and without material cost.

Figure 1:
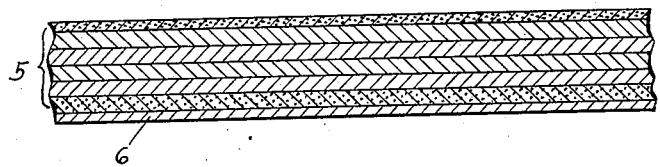
Figure 1 is an enlarged vertical section through the fiber board from which the plate embodying the invention is made.

The improved plate is made by first forming a laminated fiber board such as shown at 5 in Fig. 1 and applying to this fiber board on what is to be the lower surface of the plate a supplemental sheet of paper 6 which is initially treated for partial heat resisting qualities. The laminated structure is compacted under high pressure in accordance with usual practice and is cut to form blanks which are formed into plates by pressure in a suitable press in accordance with usual practice in the art. The fiber board is usually pre-treated and provided with sized, sprayed or pigment impregnated outer layers to provide adequate opacity and a clear clean color. If the supplementary sheet 6 has not been previously treated, the final plate is preferably sprayed on its exterior with a heat resistance solution such as sodium silicate.

Figure 2:
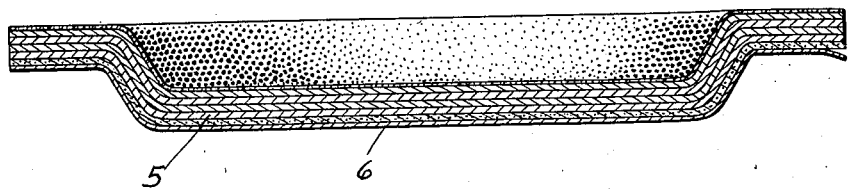
Figure 2 is an enlarged vertical section of a pie plate showing the supplemental sheet partially removed.

A cross section of the complete fiber board is shown in Figure 1 and a cross section of a pie plate 7 is shown in Figure 2. As is shown, the pie plate is formed from a multi-layer paper which in this case, has six layers, the outer ones being preferably suitably treated with paint. The supplementary layer 6 is removable due to the absorption of the binder into the body of the plate during cooking of the pie or other product. This sheet therefore has all the stains, not only of the bottom, but excess egg wash or boiled over juices and it is a complete shield to the body of the pie plate or utensil itself. It is preferably nonabsorbent and does not transmit the stains. When the sheet is removed, the pie plate regains its clean, colorful quality and is rendered acceptable for service.

The binder may be of a weak type and one that will be absorbed by the fiber of the plate or evaporated during the baking operation. This will permit the outer sheet to be removed by stripping after the utensil has been used and thus leave the fiber plate in a clean condition. I have found that moistening the sheet with water only is usually sufficient, as wrinkles formed during pressing a plate have a tendency to grip liner at intervals around the periphery. I may also use any other suitable material such as paraffin, gutta-percha or other adhesive which will be absorbed by the fiber at baking temperatures and cause the bottom liner to separate from the bottom of the plate.

Figure 3:
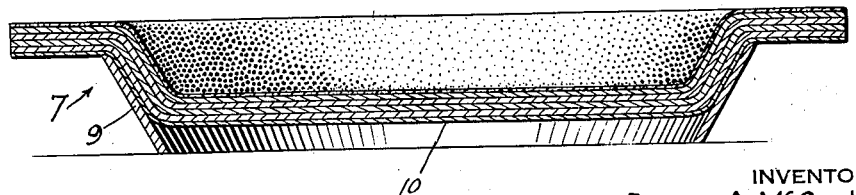
Figure 3 is an enlarged vertical section showing the use of a removable ring for spacing the plate above the bottom of the oven.

An effective manner of spacing the plate from the oven floor which has been found advantageous with my improved plates is shown in Figure 3 in which separate truncated cone rings 9 are made to closely fit the paper plate 7. Preferably the ring 9 has the same shape as the plate, and completely covers the sides. It is preferably so constructed that it holds the bottom 10 of the plate above the bottom of the oven a fraction of an inch. Usually $\frac{1}{32}$ of an inch is sufficient. This ring may be either metal or a heat resisting fiber and it will prevent the sides of the plate from being spoiled by spill-overs. The ring is loose and is slipped over the pie plate just before putting it in the oven and may be easily removed after baking. Such rings can be collected and used over again. The supporting member is preferably a close fitting ring to support the utensil in the desired manner and to shield the sides of the cooking utensil.

While I have shown a preferred embodiment of my invention, I am aware that other modifications may be made thereto and I therefore desire a broad interpretation of the invention within the scope and spirit of the description herein and of the claims appended hereinafter.

I claim:

1. The process of cooking pie in a fiber pie plate to permit adequate cooking of the lower crust at a rate compatible with the cooking of the filling and the upper crust, and to prevent discoloring of the outside of the fiber plate either by scorching or overrunning of the material to be cooked, which includes the steps of temporarily bonding a coating layer of fiber board to the outside of the fiber plate, said bond being formed in the presence of moisture and pressure, and subsequently stripping said coating layer from the plate to present a clean outer surface for shipping purposes.

2. The process of cooking and transporting pie in a fiber pie plate having sufficient thickness to permit adequate cooking of the crust at a rate compatible with the cooking of the filling, and to prevent discoloring of the outside of the fiber plate either by scorching or overrunning of the material to be cooked, which comprises the steps of temporarily bonding a heat resisting coating layer of fiber board to the outside of the fiber plate, said bond being formed in the presence of moisture and pressure, inserting the pie ingredients in said plate, cooking said pie, and subsequently stripping said coating layer from the plate, whereby said pie may be shipped in the clean appearing fiber plate.

3. A fiber pie plate of the class described having a body portion of sufficient rigidity to support a cooked or uncooked pie having a pastry crust and suitable filling, said body portion having exterior layers of fiber board, said exterior layers having pigment impregnated therein for opacity and clear, clean color, and a supplementary layer of fiber board substantially surrounding and covering the exposed bottom and outside of the body portion, said supplementary layer being temporarily bonded to the body portion and removable by stripping therefrom while the pie is carried in the plate so that a clean surface is exposed during shipment of the pie.

4. A fiber pie plate of the class described having a body portion of sufficient rigidity to support a cooked or uncooked pie having a pastry crust and suitable filling, said body portion having exterior layers of fiber board and a supplementary layer of fiber board substantialy surrounding and covering the exposed bottom and outside of the body portion, said supplementary layer being temporarily bonded to the body portion and removable by stripping therefrom while the pie is carried in the plate so that a clean surface is exposed during shipment of the pie, said supplementary layer being sprayed with sodium silicate and being substantially nonabsorbent.

5. A fiber pie plate of the class described having a body portion of sufficient rigidity to support a cooked or uncooked pie having a pastry crust and suitable filling, said body portion having upper and lower surfaces presenting a clear clean finished appearance and a supplementary layer of fiber board substantially surrounding and covering the exposed bottom and outside of the body portion, said supplementary layer being temporarily bonded to the body portion, the bond being of a character such that after being heated during the baking of the pie it is removable by stripping from the body portion while the pie is carried in the plate so that a clean surface is exposed during shipment of the pie.

JASPER A McCASKELL.